United States Patent [19]

Jesty

[11] 4,119,242

[45] Oct. 10, 1978

[54] APPARATUS FOR DISPENSING DISCRETE OBJECTS FROM A LIQUID

[76] Inventor: John Bedford Jesty, Little Meadow, Roke Rd. Bere Regis, Wareham, Dorset, England

[21] Appl. No.: 777,517

[22] Filed: Mar. 14, 1977

[30] Foreign Application Priority Data

Mar. 16, 1976 [GB] United Kingdom .............. 10512/76

[51] Int. Cl.² ............................................ B65G 47/14
[52] U.S. Cl. ................................................ 221/211
[58] Field of Search ................. 221/96, 211, 278, 200, 221/160

[56] References Cited

U.S. PATENT DOCUMENTS

3,770,164  11/1973  Hembree .............................. 221/211

*Primary Examiner*—Stanley H. Tollberg
*Attorney, Agent, or Firm*—Ostrolenk, Faber, Gerb & Soffen

[57] ABSTRACT

Apparatus for dispensing seeds individually in a small quantity of water from a suspension of seeds in water, comprises a transfer spool which is housed in a transverse bore which intersects both a chamber and a duct. The spool has a diametral passage and a conduit which connects an orifice with an annular recess. The orifice is formed in the wall of the diametral passage and is of flow restricting dimensions. The annular recess can be placed in communication with a source of liquid pressure or a low pressure reservoir. The seed chamber is filled with a suspension of seeds in water. Water is caused to flow through the seed chamber and past the orifice with the flow being first in one direction and then in the opposite direction while the diametral passage is aligned with the chamber. A seed is captured on the orifice and the suspension of seeds in water is then flushed out of the diametral passage, the recess being in communication with the low pressure reservoir. The spool is moved to align the passage with the duct and connect the recess to the source of liquid pressure so that the captured seed is released from the orifice for discharge from the duct in a small quantity of water.

33 Claims, 6 Drawing Figures

APPARATUS FOR DISPENSING DISCRETE OBJECTS FROM A LIQUID

This invention relates to apparatus for dispensing discrete objects individually and more particularly to apparatus for dispensing seeds individually from a suspension of seeds in water or an aqueous solution.

An object of this invention is to provide apparatus for isolating one discrete object from a mass of those objects and for extracting the isolated object individually.

According to this invention there is provided apparatus for dispensing discrete objects individually comprising a housing in which are formed a chamber for containing discrete objects in fluid suspension, a dispenser duct and a passage which connects the chamber and the dispenser duct; a transfer member which is supported for movement within the passage and which co-operates with the means by which it is so supported in such a manner that it prevents flow of a discrete object in fluid suspension from the chamber to the dispenser duct through the passage; a conduit formed in the transfer member so that it terminates at one end in an orifice which is too small for one of the discrete objects to pass through it, the orifice being formed in the surface of a recess which is formed in the transfer member and the transfer member being movable within the passage so that the orifice can be positioned within either of the chamber and the dispenser duct and isolated from the other; means for causing movement of discrete objects in fluid suspension in the chamber; means for creating differential pressure conditions across the orifice when the orifice is positioned within the chamber so that the pressure in the conduit is lower than the pressure of the fluid suspension of discrete objects adjacent the orifice whereby one discrete object can be held against the periphery of the orifice; and means for directing a flow of fluid along the dispenser duct towards an outlet of that duct when the orifice is positioned within the dispenser duct so that the discrete object that was held against the periphery of the orifice and carried through the passage by the transfer member is released from the orifice and conveyed to the dispenser duct outlet by the flow of fluid that is directed past the orifice.

The apparatus is particularly suitable for dispensing discrete objects such as seeds, individually from a liquid, such as water, in which they are in suspension, and for dispensing each seed in a small volume of liquid from the dispenser duct.

Preferably said means for creating differential pressure conditions across the orifice comprise means for pressurising the fluid suspension within the chamber which have the advantage that cavitation is avoided and the time required for a series of operations to dispense a number of objects sequentially is less than would be so if suction was applied to the end of the conduit remote from the orifice.

The apparatus preferably includes means for providing a separate flow of fluid under pressure to the interior of the chamber for flushing surplus discrete objects from the vicinity of the orifice when one discrete object is held against the periphery of the orifice by the differential pressure across the orifice, and the orifice is positioned within the chamber.

A liquid pump having a liquid pressure outlet may be provided, together with means for connecting the liquid pressure outlet of the pump to the interior of the chamber and to the dispenser duct, the pump being operable to supply liquid under pressure to the interior of the chamber for agitating a suspension of discrete objects in liquid adjacent the orifice when the orifice is inside the chamber, and to direct the flow of liquid along the dispenser duct towards the outlet of the duct when that part of the transfer member in which the orifice is formed is positioned within the dispenser duct, the interior of the chamber being connectable to a reservoir through a restricted orifice so that the pressure in the interior of the chamber exceeds the pressure within the conduit in the transfer member when liquid under pressure is fed to the interior of the chamber by operation of the pump. The chamber may be connectable to the reservoir via the conduit, the restricted orifice being the orifice against which a discrete object is held during operation of the apparatus.

Conveniently the transfer member extends through the chamber and is a sliding fit within at least a part of said passage as well as within at least part of another passage which communicates with said chamber opposite the passage that interconnects the chamber and the discharge duct. The chamber may be cylindrical and the opposed pair of passages may extend from the chamber in a direction which is transverse to its axis. Conveniently the recess comprises a transverse passage which is formed in and extends through the transfer member.

An alcove in the cylindrical wall of the cylindrical chamber may be provided for storing discrete objects that are to be dispensed individually. The said means for causing movement of discrete objects within a fluid suspension of discrete objects may include means for directing a jet of fluid under pressure through a mass of such discrete objects stored in the alcove so as to displace discrete objects from the mass of discrete objects stored in the alcove, direct the displaced objects in fluid suspension towards the cylindrical chamber and agitate the fluid suspension of discrete objects.

Preferably the means for connecting the liquid pressure outlet of the pump to the interior of the chamber are adapted to reverse the supply of liquid under pressure that is provided for agitating the suspension of discrete objects in liquid adjacent the orifice in order to provide the flow of fluid under pressure for flushing surplus discrete objects away from the vicinity of the orifice when one discrete object is held against the periphery of the orifice by the difference in pressure across the orifice.

The means for providing a separate flow of fluid under pressure to the interior of the chamber for flushing surplus discrete objects from the vicinity of the orifice when one discrete object is held against the periphery of the orifice by the difference in pressure across the orifice conveniently include means for establishing substantially non-turbulant flow conditions in the vicinity of the orifice whilst flushing surplus discrete objects from that vicinity.

That portion of the dispenser duct that is upstream of the junction of the dispenser duct with the passage that connects it to the chamber may be isolated by the transfer member from the portion of the dispenser duct that is downstream of that junction except when the recess communicates with the dispenser duct. When the recess comprises a passage which extends through the transfer member, that portion of the dispenser duct just downstream of the junction of the dispenser duct with the passage that connects it to the chamber forms a throat of reduced dimensions as compared with the diameter of the passage through the transfer member.

The dispenser duct of one form of apparatus in which this invention is embodied is provided with a shut-off valve between its outlet and its junction with the passage that connects it to the chamber, and shut-off valve control means which are adapted to hold the shut-off valve closed until the orifice is positioned within the dispenser duct and to open the shut-off valve for a time interval which is just sufficient to allow the flow of fluid through the dispenser duct to carry through it the discrete object that was held against the periphery of the orifice and carried through the passage by the transfer member once that discrete object is released from the orifice for conveyance to the dispenser duct outlet by the flow of fluid that is directed past the orifice. The shut-off valve may be a shuttle piston which has a transverse through passage formed in it, the transverse through passage forming part of the dispenser duct and being aligned with the remainder of the dispenser duct when the shut-off valve is open and being out of alignment with the raminder of the dispenser duct when the shut-off valve is closed. The transverse through passage may be stepped having a portion of reduced diameter at its upstream and which co-operates with that pair of the dispenser duct that extends between the shut-off valve and the junction of the dispenser duct and the passage that connects it to the chamber, to form the throat.

Means may be provided for applying fluid pressure to the conduit once the orifice is located within the dispenser duct so as to release the discrete object that was held against the periphery of the orifice by the differential pressure conditions created across the orifice.

A preferred form of apparatus for dispensing seeds individually in small volumes of water in accordance with this invention will be described now by way of example with reference to the accompanying drawings, of which.

Figure 1:
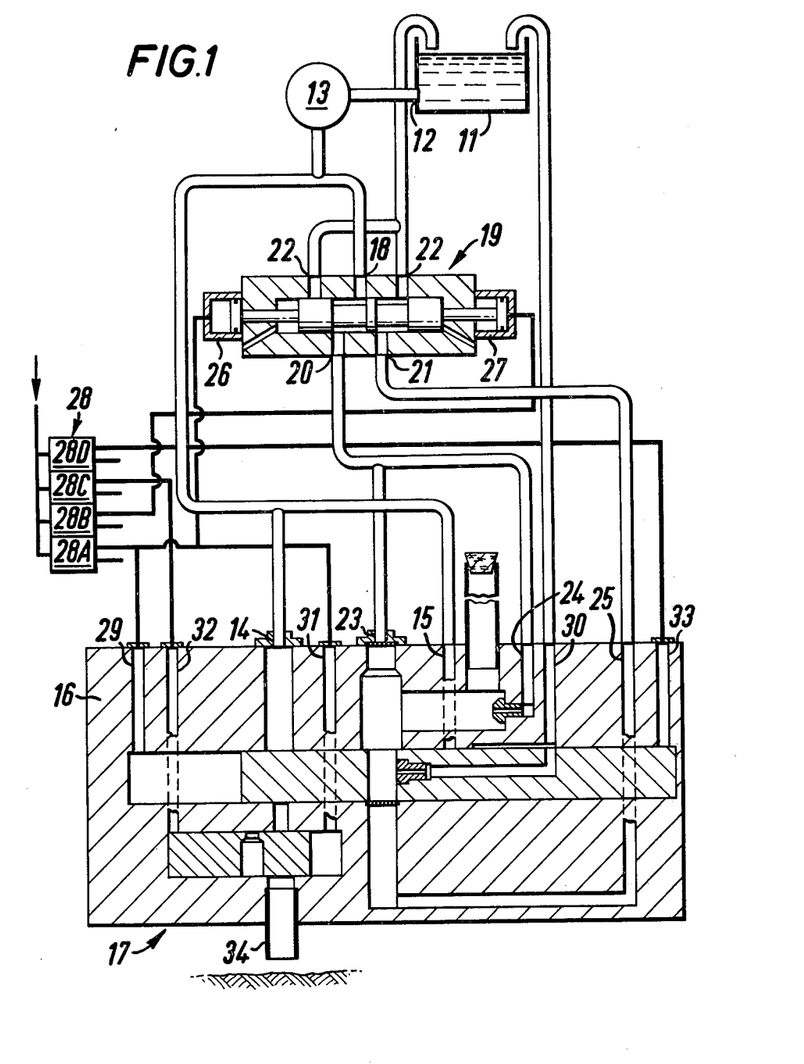
FIG. 1 is a diagrammatic illustration of a fluid presure control system for controlling operation of the apparatus.

A water reservoir 11 has an outlet 12 which is connected to an inlet of a water pump 13. The outlet of the water pump 13 is connected in parallel to a pair of inlet ports 14 and 15, which are formed in a housing 16 of a seed dispenser 17 in which this invention is embodied, and to a pressure port 18 of a pilot operated hydraulic spool valve 19. The inlet ports 14 and 15 are identified hereinafter as the first and second inlet ports respectively.

The spool valve 19 has two outlet ports 20 and 21 and a pair of drain ports 22. The pressure port 18 is between the two drain ports 22. The outlet port 20 is connected in parallel to third and fourth inlet ports 23 and 24 which are formed in the housing 16 of the seed dispenser 17. The outlet port 21 is connected to a fifth inlet port 15 formed in the housing 16. The drain ports 22 are connected to the reservoir 11.

A pneumatic actuator 26, 27 is fitted to the spool valve housing at either end of the bore in that housing in which the spool is located. Each pneumatic actuator 26, 27 comprises a piston, which is slidable within a cylinder, and a rod which extends from the piston into contact with the adjacent end of the spool. The cylinder space on the side of each piston adjacent the spool is vented and the cylinder space on the other side of each piston is connected to a first port of a respective one, 28A, 28B of a bank 28 of four three port pneumatic valves which, in common with each of the other pneumatic valves of the bank 28, has its second port vented to atmosphere and its third port connected to a compressed air supply. The normal state of each of the three port pneumatic valves is such that the cylinder space on the side of each piston remote from the spool normally is vented to atmosphere via its respective three port valve.

The spool of the spool valve 19 is positioned in a selected one of two positions within the bore in the housing and is adapted to be shifted to the other of those two positions by the adjacent actuator 26, 27 when that actuator 26, 27 receives a pulse of compressed air from its respective three port valve 28A, 28B. The spool connects the pressure port 18 to the outlet port 20 and the outlet port 21 to one of the drain ports 22 when it is at the end of the bore nearer to the actuator 27 and connects the pressure port 18 to the outlet port 21 and the outlet port 20 to the other drain port 22 when it is at the end of the bore nearer to the actuator 26.

First and second compressed air signal inputs 29 and 31, which are formed in the housing 16, are connected to the first port of the three port pneumatic valve 28A to which the cylinder space of the pneumatic actuator 26 is connected, the pneumatic actuator 26 being that which is nearer to the outlet port 21 than to the outlet port 20. A third, 28C, of the bank 28 of four three port pneumatic valves has its first port connected to a second compressed air signal input 32 formed in the housing 16 and the fourth, 28D, of the bank 28 of three port pneumatic valves has its first port connected to a fourth compressed air signal input 33 which is formed in the housing 16. The bank 28 of three port pneumatic valves may be adapted to be operable manually and individually or automatically in a controlled sequence as required.

The housing 16 has a drain port 30 formed in it between the fourth and fifth inlet ports 24 and 25. The drain port 30 is connected directly to the reservoir 11.

The seed dispenser 17 is supported in use with each of the five inlet ports 14, 15, 23, 24 and 25, the four compressed air signal inputs 29, 31, 32 and 33 and the drain port 30 formed in its upper surface. An outlet port 34 is formed in its bottom surface in coaxial alignment with the first inlet port 14.

Figure 2:
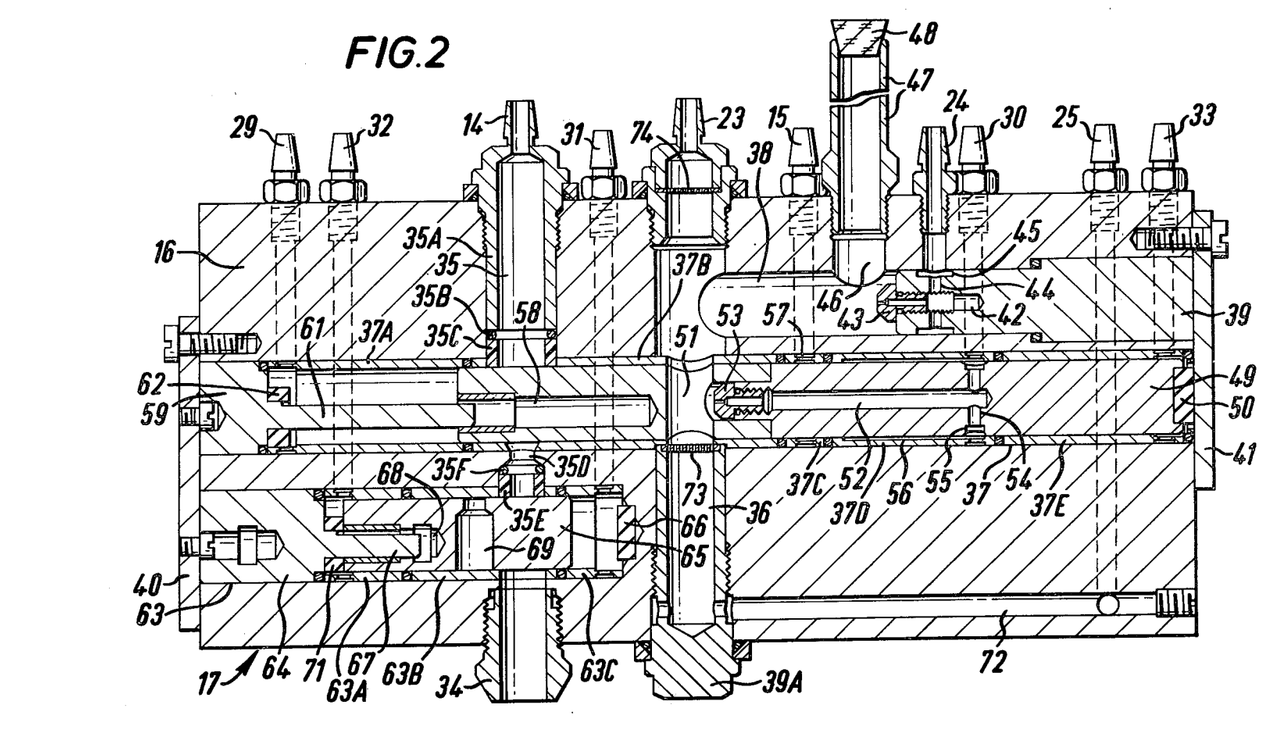
FIG. 2 is a sectioned view of the apparatus.

The construction of the seed dispenser 17 will be described now with reference to FIG. 2. The housing 16 comprises a generally rectangular block and a pair of end plates 40 and 41. The first inlet port 14 and the outlet port 34 are formed at the ends of a vertical passage 35 through the housing 16. The third inlet port 23 is formed at the upper end of another vertical passage 36 which is formed in the housing 16 and which is closed at its lower end by a hollow closure plug 36A.

A transverse bore 37, which is formed in the housing 16, intersects with each of the two vertical passages 35 and 36 and extends from end to end of the rectangular block. Another bore 38 communicates at one end with the closed ended vertical passage 36 above the transverse through bore 37 and extends from that passage 36 away from the vertical through passage 35 to the end of the rectangular block. The end of the bore 38 remote from the closed ended vertical passage 36 is closed by a plug 39 which is retained within the bore 38 by the end plate 41 which is secured to the rectangular block so that it covers that end of the bore 38 and the adjacent end of the transverse through bore 37. A blind bore 42 is formed in the plug 39 at its end nearer to the closed ended vertical passage 36. A jet nozzle 43 is screwed into the open end of the blind bore 42. Radial passages 44 place the blind bore 42 in communication with an annular recess 45 which is formed in the cylindrical surface of the plug 39. The fourth inlet port 24 communicates with the annular recess 44. A short vertical passage 46 communicates with the bore 38 between the closure plug 39 and the closed ended vertical passage 36, and extends from the bore 38 to the upper surface of the rectangular block. A tube 47 is screwed into the short vertical passage 46 and projects upwardly from that passage 46. A bung 48 or like closure member, is provided for closing the upper end of the tube 47.

A transfer spool 49 is housed within five tubes 37A, 37B, 37C, 37D and 37E which are spigotted into the transverse through bore end to end. "O" rings of elastomeric material are fitted between each adjacent pair of the tubes 37A, 37B, 37C, 37D, 37E to provide a fluid-tight seal. The transfer spool 49 is a sliding fit within those "O" rings. The end portion of the spool 49 adjacent to the end plate 41 is reduced in diameter and comprises a resilient buffer 50. The fourth compressed air input 33 communicates with the annular space that is formed around the resilient buffer 50 when that buffer 50 abuts the end plate 41. The overall length of the transfer spool 49 is greater than the distance between the end plate 41 and the nearer end of the furthest tube 37A. A diametral passage 51 which is formed through the transfer spool 49, is aligned with the closed ended vertical passage 36 when the resilient buffer 50 abuts the end plate 41 and has substantially the same diameter as the bore of the hollow closure plug 36A. The passage 36 is spanned by the tube 37B which has a diametrally opposed pair of holes formed coaxially with the passage 36 and of substantially the same diameter as the bore of the hollow closure plug 36A.

A blind bore 52, which is formed in the transfer spool 49 communicates with the diametral passage 51 and extends from that passage 51 towards the resilient buffer 50. An insert, which is screwed into the open end of the blind bore 52, forms an orifice 53 of flow restricting dimensions. The diameter of the orifice 53 is less than the diameter of a typical seed which is to be dispensed by the seed dispenser 17. Radial passages 54 place the blind bore 52 in communication with an annular recess 55 which is formed in the cylindrical surface of the transfer spool 49. A long annular recess 56, which is formed in the inner surface of the tube 37D which is the central one of the three tubes 37C, 37D and 37E that extend between the tube 37B and the end plate 41, communicates with the drain port 30 via a port in the tube 37D and, when the resilient buffer 50 is in abutment with the end plate 41, with the annular recess 55 which is aligned with it at its end nearer to the end plate 41. The long annular recess 56 extends towards the closed ended vertical passage 36 and its length is greater than the shortest distance between the vertical passages 35 and 36 but is less than the distance between the axes of those passages 35 and 36. A shorter annular recess 57, which is formed in the tube 37C between the long annular recess 56 and the closed ended vertical passage 36, is spaced from that end of the long annular recess 56 with which the annular recess 55 communicates when the resilient buffer 50 abuts the end plate 41, by a distance which is substantially equal to the spacing between the axes of the two vertical passages 35 and 36. The second inlet port 15 communicates with the shorter annular recess 57 via a port in the tube 37C.

A blind bore 58 is formed in the transfer spool 49 at its end which is further from the end plate 41. The blind bore 58 extends parallel to the axis of the transfer spool 49 and is spaced radially from that axis. The end of the transverse through bore 37 remote from the end plate 41 is closed by a closure plug 59 which has a non-circular finger 61 which is engaged within the blind bore 58 so as to prevent angular movement of the transfer spool 49. There is an 'O'-ring of elastomeric material trapped between the closure plug 59 and the tube 37A and another 'O'-ring of elastomeric material trapped between the end plate 41 and the tube 37E. These two 'O'-rings, as well as the 'O'-rings disposed between the tubes 37A, 37B, 37C, 37D and 37E, are compressed axially in order to ensure that they effect a fluid-tight seal. An annular buffer 62 of resilient material is seated within the annular shoulder formed around the root of the finger 61. The distance between the annular buffer 62 and the adjacent end face of the transfer spool 49, when the resilient buffer 50 abuts the end plate 41, is at least equal to the spacing between the vertical axes of the vertical passages 35 and 36. The first input 29 communicates with the annular space formed around the annular buffer 62 within the transverse through bore 37 via a port in the tube 37A.

A closed ended bore 63 is formed within the rectangular block below the transverse through bore 37. The closed end of the bore 63 is formed between the two vertical passages 35 and 36 and the bore 63 intersects the vertical through bore 35.

A closure plug 64 closes the outer end of the closed ended bore 63. The two closure plugs 59 and 64 are retained within their respective bores 37 and 63 by the end plate 40 which is secured to the end of the rectangular block.

A shuttle piston 65 is housed within three tubes 63A, 63B and 63C which are spigotted into the bore 63 between the closure plug 64 and a resilient buffer 66 at the closed end of that bore 63. 'O'-rings of elastomeric material are fitted between each adjacent pair of the tubes 63A, 63B and 63C and between the tube 63A and the closure plug 64. These 'O'-rings are compressed axially in order to ensure that they effect a fluid-tight fit of the tubes 63A, 63B and 63C between the closure plug 64 and the closed end of the bore 63. The shuttle piston 65 is a sliding fit within the 'O'-rings that are trapped between the tubes 63A, 63B and 63C. A non-circular finger 67 projects from an end of the closure plug 64 into a blind bore 68 which is formed within the shuttle piston 65 so that it extends parallel to the axis of the shuttle piston 65 and is offset from the centre of the shuttle piston 65. Hence angular movement of the shuttle piston 65 within the bore 63 is prevented by engagement of the non-circular finger 67 within the blind bore 68. A stepped transverse through passage 69 is formed within the shuttle piston 65. An annular buffer 71 of resilient material is seated within the annular shoulder that is formed around the root of the non-circular finger 67. The distance between the annular buffer 71 and the vertical through passage 35 is greater than the distance between the stepped transverse through passage 69 and the end face of the shuttle piston 65 that co-operates with that annular buffer 71 to limit movement of the shuttle piston 65 towards the closure plug 63. Hence the stepped transverse through passage 69 is out of alignment with the vertical passage 35 when the shuttle piston 65 abuts the annular buffer 71. The spacing between the transverse through passage 69 and the end of the shuttle piston 65 that is nearer the resilient buffer 66 at the closed end of the bore 63 is such that the transverse through passage 69 is aligned with the vertical through passage 35 when the shuttle piston 65 abuts that resilient buffer 66.

That portion of the vertical through passage 35 which extends above the transverse through bore 37 is formed by the bore of a rigid tubular insert 35A, which forms the first inlet port 14 and which is screwed into the upper end of a vertical bore in the housing 16, by an O-ring 35B of elastomeric material and by the bore of a sleeve 35C of polytetrafluoroethylene (P.T.F.E.) or other suitable low friction plastics material which is suitable for providing an effective fluid-tight dynamic seal in water. The lower portion of the sleeve 35C is spigotted into an aperture which is formed coaxially in the upper part of the tube 37B. The lower edge of the sleeve 35C is contoured so that the sleeve 35C is seated upon the cylindrical surface of the transfer spool 49. The dimensions of the insert 35A and the sleeve 35C are such that the elastomeric material of the O-ring 35B is compressed so that the sleeve 35C is urged into fluid-tight engagement with the transfer spool 49 by the resilience of the elastomeric material of the O-ring 35B. Hence, the interengagement of the contoured lower edge of the sleeve 35C with the cylindrical surface of the transfer spool 49 provides an effective fluid-tight seal against the leakage of water from within the bore of the sleeve 35C along the cylindrical surface of the transfer spool 49. The diameter of the bore of the sleeve 35C is substantially equal to that of the diametral passage 51.

Another aperture is formed in the lower part of the tube 37B. This other aperture is aligned coaxially with the bore of the sleeve 35C and converges downwardly. The diameter of the larger diameter end of the convergent aperture is smaller than the diameter of the sleeve 35C. That portion of the vertical through passage 35 that extends between the transverse bore 37 and the closed ended bore 63 is formed by a short bore 35D, which is formed in the housing 16, and by the bore of another sleeve 35E of P.T.F.E. or similar material, which is below the short bore 35D. An O-ring 35F of elastomeric material is trapped between the upper edge of the sleeve 35E and an annular shoulder which is formed by the housing 16 at the foot of the short bore 35D. The elastomeric material of the O-ring 35D is compressed so that the sleeve 35E is urged to seat upon the cylindrical surface of the shuttle piston 65 and the lower edge of the sleeve 35E is contoured so that it seats upon the cylindrical surface of the shuttle piston 65 to effect a fluid-tight seal against leakage of water from within the bore of the sleeve 35E along the cylindrical surface of the shuttle piston 65. The diameter of the short bore 35D and of the sleeve 35E is substantially equal to the diameter of the smaller diameter portion of the stepped transverse through passage 69 as well as to the diameter of the smaller lower end of the convergent aperture in the tube 37B.

The portion of the vertical through passage 35 that extends below the closed ended bore 63 to form the outlet 34 has a diameter which is substantially equal to that of the larger diameter portion of the stepped transverse through passage 69 and of the diametral passage 51.

It follows that the portion of the vertical through passage 35 between the two bores 37 and 63, together with the smaller diameter portion of the stepped transverse through passage 69 that is at the upper end of the passage 69, co-operate together to form a throat of restricted dimensions within the vertical through passage 35 when the stepped transverse through passage 69 is aligned with the vertical through passage 35.

The third compressed air input 32 communicates with the annular space formed in the bore 63 around the annular buffer 71. The second compressed air input 31 communicates with an annular space which is formed around the shuttle piston 65 adjacent the closed end of the bore 63 when that shuttle piston 65 abuts the resilient buffer 66 at that closed end.

The fifth inlet port 25 communicates with the closed ended vertical passage 36 adjacent its closed lower end via a passage 72 in the rectangular block.

An apertured filter plate 73 is supported by the hollow closure plug 36A within a recess in the outer cylindrical surface of the tube 37B so that it extends across the closed ended vertical passage 36 in the region of the lower edge of the transverse through bore 37. Another apertured filter plate 74 extends across the closed ended vertical passage 36 between the third inlet port 23 at its upper end and the intersection of the bore 38 with the passage 36. The number of holes in the upper apertured plate 74 is less than the number of holes in the lower apertured plate 73 and the spacing between adjacent holes in the lower apertured plate 73 is less than the diameter of a typical seed that is to be dispensed by the seed dispenser 17.

Operation of the apparatus will be described now with reference to FIG. 1 and FIGS. 3, 4, 5 and 6.

In order to prepare the apparatus for use, the spool valve 19 is set in the condition shown in FIG. 1 in which the pressure port 18 is connected to the outlet port 20 and the outlet port 21 is connected to drain. The transfer spool 49 is positioned with its resilient buffer 50 in contact with the end plate 41 so that the diametral passage 51 is aligned coaxially with the closed ended vertical passage 36 and the annular recess 55 is in communication with the long annular recess 56 at the end of that recess 56 which is further from the closed ended vertical passage 36. The shuttle piston 65 is in abutment with the annular buffer 71 so that the stepped transverse through passage 69 is out of alignment with the vertical through passage 35. It will be seen that the upper and lower parts of the vertical closed ended passage 36 communicate with one another through the diametral passage 51 in the transverse spool 39 and that the central part of the vertical through passage 35, that is between the transverse through bore 37 and the closed ended bore 63, is isolated from the first inlet port 14 by the transfer spool 49 and from the outlet port 34 by the shuttle piston 65.

The tube 47 is filled with seeds that are to be dispensed and the upper end of that tube 47 is closed by the bung 48. A pile of the seeds is formed in the bore 38 at the foot of the short vertical passage 46 and covers the face of the jet nozzle 43. The pile tends to slope downwardly from the vertical passage 46 towards the intersection of the bore 38 and the closed ended vertical passage 36 at an angle of approximately 45°. It will be noted that the diameter of the portion of the closed ended vertical passage 36 with which the bore 38 communicates is greater than that of the diametral passage 51 and the portion of that passage 36 below the transverse bore 37. The closed ended vertical passage 36, the bore 38, the short vertical passage 46 and the tube 47 together comprise a seed storage chamber.

The seed dispenser 17 is positioned so that the outlet port 34 is directly above the location at which an individual seed is to be planted.

The pump 13 is driven continuously so that the system is charged with water. Hence the seeds stored in the seed storage chamber are in suspension in water. The transfer spool 49 and the shuttle piston 65 prevent flow of water from the upper part of the vertical through passage 35 to the outlet port 34.

The initial setting of the spool valve 19 causes liquid under pressure to be fed into the closed ended vertical passage 36 from its upper end through the third inlet port 23 as well as through the fourth inlet port 24 and the jet nozzle 43 into the bore 38. The supply of liquid under pressure into the closed ended vertical passage 36 via the third and fourth inlet ports 23 and 24 displaces water from that passage 36 and water so displaced is returned to the reservoir 11 via two paths. One of those paths is formed by the passage 72 which communicates with the vertical passage 36 at its lower end and which is connected to the reservoir 11 via the outlet port 21 and one of the drain ports 22 of the spool valve 19. Hence there is a general downward flow of liquid within the vertical through passage 36. The lower apertured filter plate 73 prevents seeds being carried below the transfer spool 49 with the flow of water towards the passage 72. The other path for return of liquid from the vertical passage 36 to the reservoir 11 is formed by the orifice 53 of restricted dimensions, the blind bore 52, the radial passages 54, the annular recesses 55 and 56 and the drain port 30. The restriction to flow through the orifice 53 to the reservoir 11 causes the pressure in the diametral passage 51 to be higher than the pressure in the blind bore 52.

Figure 3:
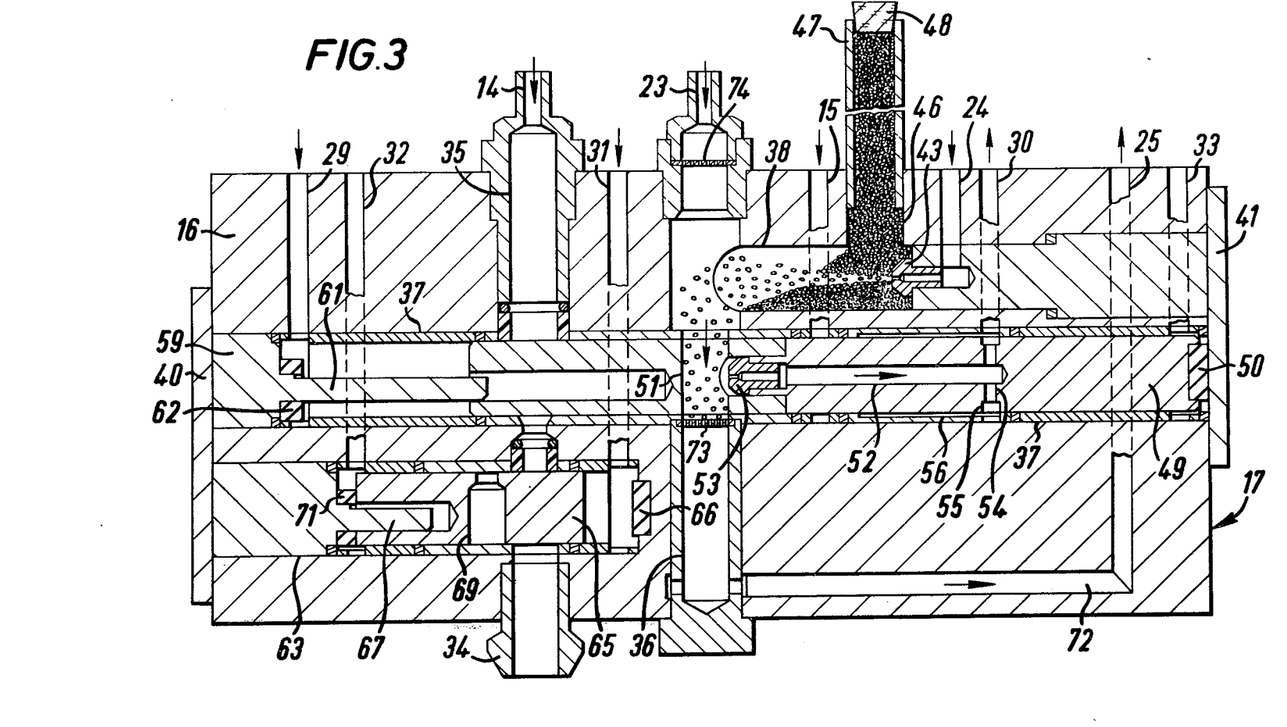
FIGS. 3, 4, 5 and 6 are similar to FIG. 2 and illustrate the condition of the apparatus at different stages in a cycle of its operation.

The jet of liquid that is directed into the bore 38 through the jet nozzle 43 displaces seeds from the pile of seeds in front of the nozzle 43 at the foot of the short vertical passage 46. The seeds so displaced are suspended in water and are conveyed with the general flow of water towards and into the diametral passage 51 in the transverse bore 49. The jet of water that emerges from the jet nozzle 43 also agitates the suspension of seeds in water contained within the bore 38 and the closed ended vertical passage 36. The flow of water into the blind bore 52 through the orifice 53 of restricted dimensions is drawn from the agitated suspension of seeds in water that is within the diametral passage 51 and that flow carries seeds with it towards the orifice 53. This leads to a seed being held against the periphery of the orifice 53, which is too small to allow that seed to flow through it, by the action of the excess pressure in the diametral passage 51 as compared with the pressure in the blind bore 52. The flow conditions within the seed dispenser 17 that lead to such capture of a seed which is held against the periphery of the orifice 53 is illustrated in FIG. 3. Experience has shown that a seed is captured in this manner almost invariably and in a short time.

Figure 4:
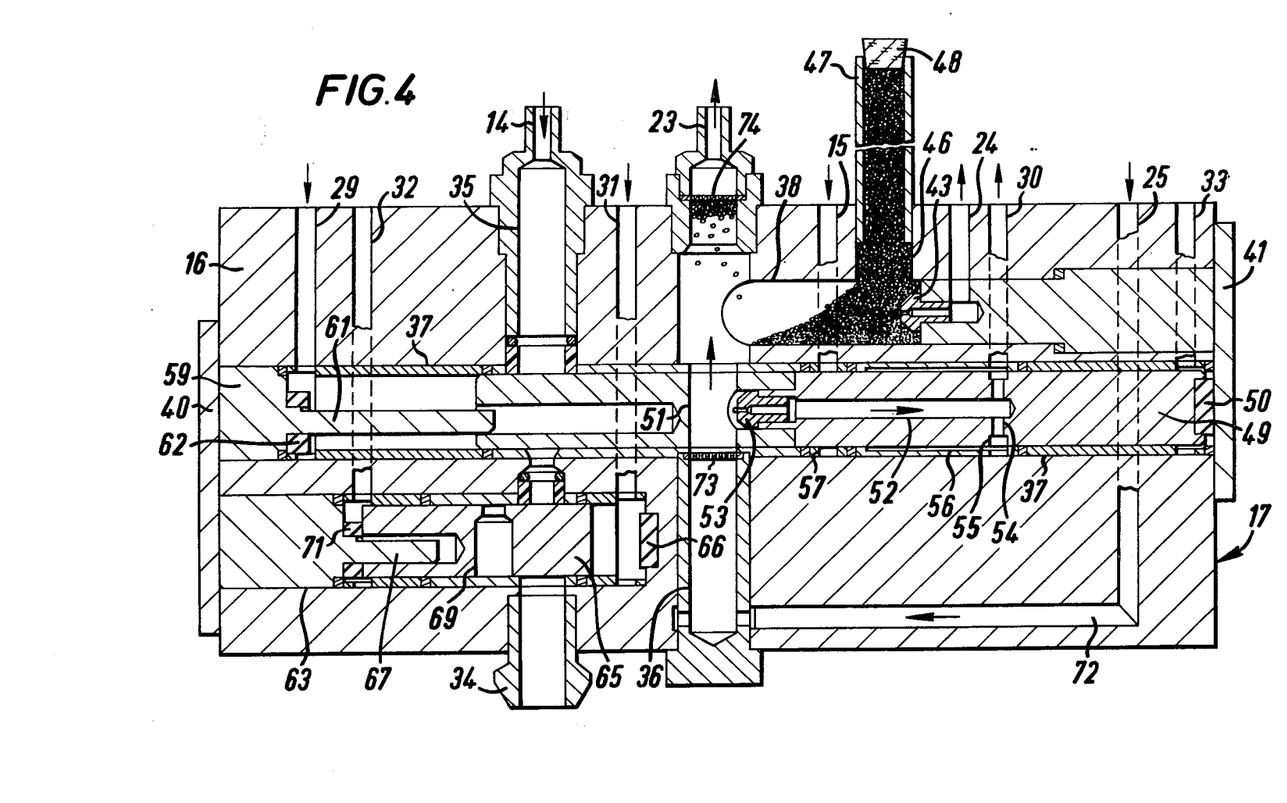

The three port pneumatic valve 28B is actuated, either manually or automatically, to change its state once a time interval sufficient to allow a seed to be captured and held against the periphery of the orifice 53 has past. Such change of state of the three port pneumatic valve 28B causes a pulse of compressed air to be transmitted to the pneumatic actuator 27 to change over the connections that are made by the spool valve 19. Such a change over disconnects the third and fourth inlet ports 23 and 24 from the pressure port 18 and connects them to a drain port 22 whilst disconnecting the fifth inlet port 25 from drain and connecting it to the pressure port 18. Hence, as is illustrated in FIG. 4, the direction of flow of water through the vertical through passage 36 is reversed so that water flows upwards from the closed lower end of the passage 36 towards the third inlet port 23 as well as through the bore 38 and the jet nozzle 43 to the fourth inlet port 24. The conditions of excess pressure in the diametral passage 51 as compared with that in the bore 52 are maintained so that the captured seed remains held against the periphery of the orifice 53.

It is desirable for the upward flow of water through the diametral passage 51 to be substantially non-turbulant and this may be achieved conveniently by the action of the lower apertured filter plate 73 that acts as a flow straightener.

The upper apertured filter plate 74 bars the passage of seeds through the third inlet port 23 and ensures that they remain within the seed chamber. The jet nozzle 43 is too small to allow the passage of seeds through it. The arrangement of the holes of the lower apertured filter plate 73, such that they are spaced from one another by a maximum distance which is smaller than the diameter of a typical seed that is to be dispensed by the seed dispenser 17, inhibits any tendency for such a seed to remain upon the apertured seed plate 73. Hence the upward flow of water through the diametral passage 51 flushes from that passage 51 all the seeds that were in suspension in the water in that passage 51, apart from the seed that is captured and held against the periphery of the orifice 53.

Figure 5:
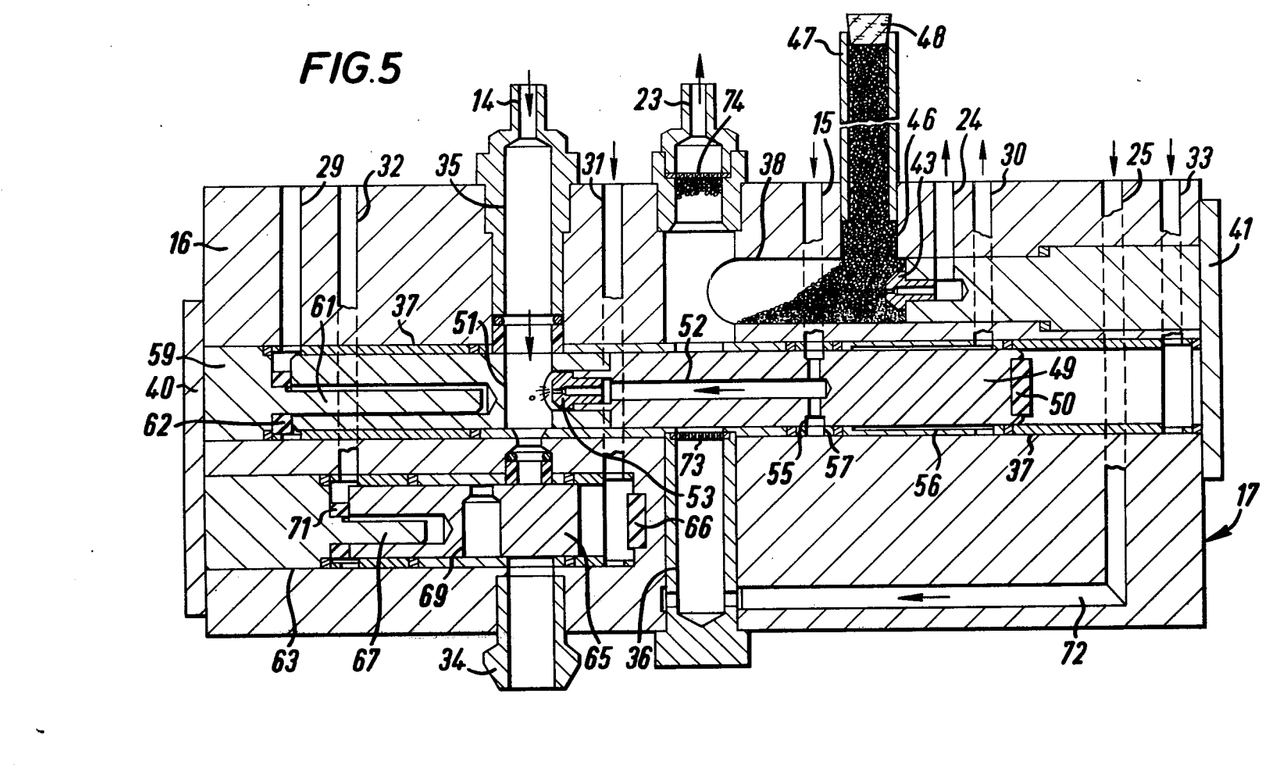
Figure 6:
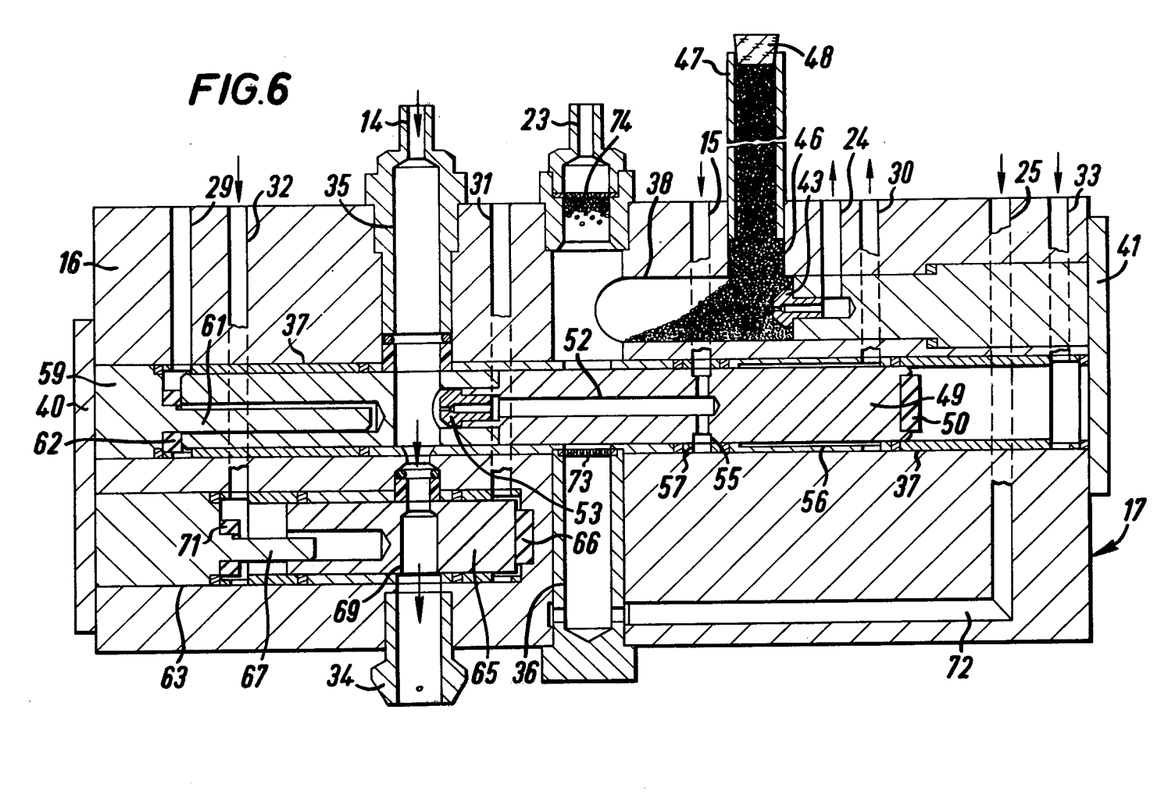

The three port pneumatic valve 28D is actuated, either manually or automatically, to transmit a pulse of compressed air through the fourth input 33 after the passage of a time interval adequate to ensure that the agitated suspension of seeds in water within the diametral passage 51 has been flushed out of that diametral passage 51 by the upward flow of water through that passage 51. The transfer spool 49 is displaced from the end plate 41 by the pulse of compressed air and it moves towards the closure plug 59 until such movement is arrested by abutment with the annular buffer 62 as illustrated in FIG. 5. The annular recess 55 in the transfer spool 49 remains in communication with the long annular recess 56 for most of the movement of the transfer spool 49 towards the end plug 59 and at least until communication between the water filled upper portion of the vertical through passage 35 with the diametral passage 51 is established. Hence water is trapped within the diametral passage 51 at a pressure above that within the blind bore 52 at least until the diametral passage 51 communicates with the vertical through passage 35. Consequently the captured seed remains held against the periphery of the orifice 53 of restricted dimensions until communication between the vertical through passage 35 and the diametral passage 51 is established.

The diametral passage 51 is aligned with the vertical through passage 35 when movement of the transfer spool 49 towards the closure plug 59 is arrested by abutment with the annular buffer 62. At the same time the annular recess 55 in the transfer spool 49 is brought into alignment with the shorter annular recess 57. Hence the pressure in the blind bore 52 is now equated to that in the upper portion of the vertical through passage 35 because they are both connected directly to the output of the pump 13. Consequently the seed is released from the orifice 53 of restricted dimensions, as shown in FIG. 5, because balanced pressure conditions are established across that seed.

The three port pneumatic valve 28C is actuated either manually or automatically after the elapse of a time interval adequate to ensure that movement of the transfer spool 49 into abutment with the annular buffer 62 has been completed. The three port pneumatic valve 28C emits a pulse of compressed air to the third input 32 when so actuated. That pulse of compressed air displaces the shuttle piston 65 towards the closed end of the bore 63 so as to bring the stepped transverse through passage 69 into alignment with the vertical through passage 35. The vertical through passage 35 is now open to allow flow of water to the outlet port 34 and such a flow carries the released seed with it through the outlet 34.

After the elapse of a time interval which is just sufficient to allow passage of the released seed through the stepped transverse through passage 69 with the minimum volume of water, the three port pneumatic valve 28A is actuated, either automatically or manually, to emit a pulse of compressed air. This pulse of compressed air is directed in parallel to the first input 29, the second input 31 and to the pneumatic actuator 26 so as to return the transfer spool 49, the shuttle piston 65 and the spool of the spool valve 19 to the positions shown in FIGS. 1 and 2 so that the flow of liquid to the outlet port 34 is shut off immediately the seed has been carried through the stepped transverse through passage 69 and so that the system is reset to select and dispense another seed individually.

The various 'O' rings of elastomeric material seal against leakage of water from either of the vertical passages to the other or to either end of either of the bores 37 and 63 along the cylindrical surfaces of the transfer spool 49, the tubes or the shuttle piston 65.

It may be desirable to arrange for a flow of water to be directed into the diametral passage 51 in a direction substantially parallel to the axis of the transverse through bore 37 and from a suitable passage in the transfer spool 39 which opens into the diametral passage 51 opposite that part of the passage 51 in which the blind bore 52 is formed. Such a flow of water may be in addition to or instead of the upward flow of water from the passage 72 and would serve to flush the agitated suspension of seeds in water from within the diametral passage 51 before the transfer spool 49 is moved out of alignment with the closed ended vertical passage 36 and into alignment with the vertical through passage 35.

It may be possible to omit the shuttle piston 65 and the bore 63 within which it is housed if the shut-off valve function afforded by the shuttle piston 65 can be effected satisfactorily by the transfer spool 49 alone. It would be desirable to provide a P.T.F.E. sleeve, like the sleeves 35C and 35E, which is urged into fluid-tight engagement with the lower portion of the cylindrical surface of the transfer spool 49 if such a modification was made. That part of the discharge duct downstream of the transverse bore 37 would still be configured to form a throat between the bore 37 and the outlet 34, that throat being as close to the bore 37 as possible.

I claim:

1. Apparatus for dispensing discrete objects individually comprising a housing in which are formed a chamber for containing discrete objects in fluid suspension, a dispenser duct and a passage which connects the chamber and the dispenser duct; a transfer member; supporting means which support the transfer member for movement within the passage and which co-operate with the transfer member to prevent flow of a discrete object in fluid suspension from the chamber to the dispenser duct through the passage; a recess and a conduit which are formed in the transfer member; an orifice which is formed in the surface of the recess at one end of the conduit and which is too small for one of the discrete objects to pass through it, the transfer member being movable within the passage so that the orifice can be positioned within either of the chamber and the dispenser duct and isolated from the other; means for causing movement of discrete objects in fluid suspension in the chamber; means for creating differential pressure conditions across the orifice when the orifice is positioned within the chamber so that the pressure in the conduit is lower than the pressure of the fluid suspension of discrete objects adjacent the orifice whereby one discrete object can be held against the periphery of the orifice; and means for directing a flow of fluid along the dispenser duct towards an outlet of that duct and transversely across the orifice when the orifice is positioned within the dispenser duct so that the discrete object that was held against the periphery of the orifice and carried through the passage by the transfer member is released from the orifice and conveyed to the dispenser duct outlet by the flow of fluid that is directed across the orifice.

2. Apparatus for dispensing discrete objects individually according to claim 1, wherein said means for creating differential pressure conditions across the orifice comprise means for pressurising the fluid suspension within the chamber.

3. Apparatus for dispensing discrete objects individually according to claim 1, including means for providing a separate flow of fluid under pressure to the interior of the chamber for flushing surplus discrete objects from the vicinity of the orifice when one discrete object is held against the periphery of the orifice by the differential pressure across the orifice and the orifice is positioned within the chamber.

4. Apparatus for dispensing discrete objects individually according to claim 3, wherein the means for providing a separate flow of fluid under pressure to the interior of the chamber for flushing surplus discrete objects from the vicinity of the orifice when one discrete object is held against the periphery of the orifice by the difference in pressure across the orifice include means for establishing substantially non-turbulant flow conditions in the vicinity of the orifice whilst flushing surplus discrete objects from that vicinity.

5. Apparatus for dispensing discrete objects individually from a liquid comprising a housing in which are formed a chamber for containing discrete objects in suspension in a liquid, a dispenser duct and a passage which interconnects the chamber and the dispenser duct; a transfer member; supporting means which support the transfer member for movement within the passage and which co-operate with the transfer member to prevent flow of a discrete object in suspension in the liquid from the chamber to the dispenser duct through the passage; a recess and a conduit formed in the transfer member; an orifice which is formed in the surface of the recess at one end of the conduit and which is too small for one of the discrete objects to pass through it, the transfer member being movable within the passage so that the orifice can be positioned within either of the chamber and the dispenser duct; means for causing movement of discrete objects within a suspension of such discrete objects in liquid within the chamber; means for creating differential pressure conditions across the orifice when the orifice is positioned within the chamber so that the pressure in the conduit is lower than the pressure of the suspension of discrete objects in liquid adjacent the orifice whereby one discrete object can be held against the periphery of the orifice; and means for directing a flow of liquid along the dispenser duct towards an outlet of that duct when the orifice is positioned within the dispenser duct so that the discrete object that was held against the periphery of the orifice and carried through the passage by the transfer member is released from the orifice and conveyed to the dispenser duct outlet by the flow of liquid that is directed past the orifice.

6. Apparatus for dispensing discrete objects individually from a liquid according to claim 5, including a liquid pump having a liquid pressure outlet, a liquid reservoir and means for connecting the liquid pressure outlet of the pump to the interior of the chamber and to the dispenser duct, said means for connecting the liquid pressure outlet to the interior of the chamber and to the dispenser duct being operable to supply liquid under pressure to the interior of the chamber for agitating a suspension of discrete objects in liquid adjacent the orifice, when the orifice is inside the chamber, and to direct the flow of liquid along the dispenser duct towards the outlet of the duct when that part of the transfer member in which the orifice is formed is positioned within the dispenser duct, the interior of the chamber being connectable to the liquid reservoir through a restricted orifice so that the pressure in the interior of the chamber exceeds the pressure within the conduit in the transfer member when liquid under pressure is fed to the interior of the chamber by operation of the pump.

7. Apparatus for dispensing discrete objects individually from a liquid according to claim 6, including means for providing a separate flow of fluid under pressure to the interior of the chamber for flushing surplus discrete objects from the vicinity of the orifice when one discrete object is held against the periphery of the orifice by the differential pressure across the orifice and the orifice is positioned within the chamber, wherein the means for connecting the liquid pressure outlet of the pump to the interior of the chamber are adapted to reverse the supply of liquid under pressure that is provided for agitating the suspension of discrete objects in liquid adjacent the orifice in order to provide the flow of fluid under pressure for flushing surplus discrete objects away from the vicinity of the orifice when one discrete object is held against the periphery of the orifice by the difference in pressure across the orifice.

8. Apparatus for dispensing discrete objects individually from a liquid according to claim 6, wherein the chamber is connectable to the reservoir via the conduit, the orifice against which a discrete object is adapted to be held being the restricted orifice.

9. Apparatus for dispensing discrete objects individually according to claim 1, wherein the transfer member extends through the chamber and is a sliding fit within at least a part of said passage as well as within at least part of another passage which communicates with said chamber opposite the passage that interconnects the chamber and the discharge duct.

10. Apparatus for dispensing discrete objects individually according to claim 9, wherein the chamber is cylindrical and the opposed pair of passages extend from the chamber in a direction which is transverse to its axis.

11. Apparatus for dispensing discrete objects individually according to claim 9, wherein the recess comprises a passage which is formed in and which extends through the transfer member.

12. Apparatus for dispensing discrete objects individually according to claim 10, wherein an alcove which is formed in the cylindrical wall of the cylindrical chamber is provided for storing discrete objects that are to be dispensed individually.

13. Apparatus for dispensing discrete objects individually according to claim 12, wherein said means for causing movement of discrete objects within a fluid suspension of discrete objects include means for directing a jet of fluid under pressure through a mass of such discrete objects stored in the alcove so as to displace discrete objects from the mass of discrete objects stored in the alcove, direct the displaced objects in fluid suspension towards the cylindrical chamber and agitate the fluid suspension of discrete objects.

14. Apparatus for dispensing discrete objects individually according to claim 1, wherein the portion of the dispenser duct that is upstream of the junction of the dispenser duct with the passage that connects it to the chamber is isolated by the transfer member from the portion of the dispenser duct that is downstream of that junction except when the recess communicates with the dispenser duct.

15. Apparatus for dispensing discrete objects individually according to claim 14, wherein the recess comprises a passage which is formed in and which extends through the transfer member and that portion of the dispenser duct just downstream of the junction of the dispenser duct with the passage that connects it to the chamber forms a throat of reduced dimensions as compared with the diameter of the passage through the transfer member.

16. Apparatus for dispensing discrete objects individually according to claim 1, wherein the dispenser duct is provided with a shut-off valve between its outlet and its junction with the passage that connects it to the chamber, and shut-off valve control means which are adapted to hold the shut-off valve closed until the orifice is positioned within the dispenser duct and to open the shut-off valve for a time interval which is sufficient to allow the flow of fluid through the dispenser duct to carry through it the discrete object that was held against the periphery of the orifice and carried through the passage by the transfer member once that discrete object is released from the orifice for conveyance to the dispenser duct outlet by the flow of fluid that is directed past the orifice.

17. Apparatus for dispensing discrete objects individually according to claim 16, wherein the shut-off valve is a shuttle piston which has a transverse through passage formed in it, the transverse through passage forming part of the dispenser duct and being aligned with the remainder of the dispenser duct when the shut-off valve is open and being out of alignment with the remainder of the dispenser duct when the shut-off valve is closed.

18. Apparatus for dispensing discrete objects individually according to claim 17, in which the portion of the dispenser duct that is upstream of the junction of the dispenser duct with the passage that connects it to the chamber is isolated by the transfer member from the portion of the dispenser duct that is downstream of that junction except when the recess communicates with the dispenser duct, the recess comprises a passage which is formed in and which extends through the transfer member and that portion of the dispenser duct just downstream of the junction of the dispenser duct with the passage that connects it to the chamber forms a throat of reduced dimensions as compared with the diameter of the passage through the transfer member, wherein the transverse through passage is stepped having a portion of reduced diameter at its upstream end which co-operates with that part of the dispenser duct that extends between the shut-off valve and the junction of the dispenser duct and the passage that connects it to the chamber, to form the throat.

19. Apparatus for dispensing discrete objects individually according to claim 1, including means for applying fluid pressure to the conduit once the orifice is located within the dispenser duct so as to release the discrete object that was held against the periphery of the orifice by the differential pressure conditions created across the orifice.

20. Apparatus for dispensing discrete objects individually according to claim 5, wherein said means for creating differential pressure conditions across the orifice comprise means for pressurizing a suspension of such discrete objects in liquid within the chamber.

21. Apparatus for dispensing discrete objects individually according to claim 5, including means for providing a separate flow of liquid under pressure to the interior of the chamber for flushing surplus discrete objects from the vicinity of the orifice when one discrete object is held against the periphery of the orifice by the differential pressure across the orifice and the orifice is positioned within the chamber.

22. Apparatus for dispensing discrete objects individually according to claim 21, wherein the means for providing a separate flow of liquid under pressure to the interior of the chamber for flushing surplus discrete objects from the vicinity of the orifice when one discrete object is held against the periphery of the orifice by the difference in pressure across the orifice include means for establishing substantially non-turbulent flow conditions in the vicinity of the orifice whilst flushing surplus discrete objects from that vicinity.

23. Apparatus for dispensing discrete objects individually according to claim 5, wherein the transfer member extends through the chamber and is a sliding fit within at least a part of said passage as well as within at least part of another passage which communicates with said chamber opposite the passage that interconnects the chamber and the discharge duct.

24. Apparatus for dispensing discrete objects individually according to claim 23, wherein the chamber is cylindrical and the opposed pair of passages extend from the chamber in a direction which is transverse to its axis.

25. Apparatus for dispensing discrete objects individually according to claim 23, wherein the recess comprises a passage which is formed in and which extends through the transfer member.

26. Apparatus for dispensing discrete objects individually according to claim 24, wherein an alcove which is formed in the cylindrical chamber wall of the cylindrical chamber is provided for storing discrete objects that are to be dispensed individually.

27. Apparatus for dispensing discrete objects according to claim 26, wherein said means for causing movement of discrete objects within a liquid suspension of discrete objects include means for directing a jet of liquid under pressure through a mass of such discrete objects stored in the alcove so as to displace discrete objects from the mass of discrete objects stored in the alcove, direct the displaced objects in liquid suspension towards the cylindrical chamber and agitate the liquid suspension of discrete objects.

28. Apparatus for dispensing discrete objects individually according to claim 5, wherein the portion of the dispenser duct that is upstream of the junction of the dispenser duct with the passage that connects it to the chamber is isolated by the transfer member from the portion of the dispenser duct that is downstream of that junction except when the recess communicates with the dispenser duct.

29. Apparatus for dispensing discrete objects individually according to claim 28, wherein the recess comprises a passage which is formed in and which extends through the transfer member and that portion of the dispenser duct just downstream of the junction of the dispenser duct with the passage that connects it to the chamber forms a throat of reduced dimensions as compared with the diameter of the passage through the transfer member.

30. Apparatus for dispensing discrete objects individually according to claim 5, wherein the dispenser duct is provided with a shut-off valve between its outlet and its junction with the passage that connects it to the chamber, and shut-off valve control means are adapted to hold the shut-off valve closed until the orifice is positioned within the dispenser duct and to open the shut-off valve for a time interval which is sufficient to allow the flow of liquid through the dispenser duct to carry through it the discrete object that was held against the periphery of the orifice and carried through the passage by the transfer member once that discrete object is released from the orifice for conveyance to the dispenser duct outlet by the flow of liquid that is directed past the orifice.

31. Apparatus for dispensing discrete objects individually according to claim 30, wherein the shut-off valve is a shuttle piston which has a transverse through passage formed in it, the transverse through passage forming part of the dispenser duct and being aligned with the remainder of the dispenser duct when the shut-off valve is open and being out of alignment with the remainder of the dispenser duct when the shut-off valve is closed.

32. Apparatus for dispensing discrete objects individually according to claim 31, in which the portion of the dispenser duct that is upstream of the junction of the dispenser duct with the passage that connects it to the chamber is isolated by the transfer member from the portion of the dispenser duct that is downstream of that junction except when the recess communicates with the dispenser duct, the recess comprises a passage which is formed in and which extends through the transfer member and that portion of the dispenser duct just downstream of the junction of the dispenser duct with the passage that connects it to the chamber forms a throat of reduced dimensions as compared with the diameter of the passage through the transfer member, wherein the transverse through passage it stepped having a portion of reduced diameter at its upstream end which cooperates with that part of the dispenser duct that extends between the shut-off valve and the junction of the dispenser duct and the passage that connects it to the chamber, to form the throat.

33. Apparatus for dispensing discrete objects individually according to claim 5, including means for applying liquid pressure to the conduit once the orifice is located within the dispenser duct so as to release the discrete object that was held against the periphery of the orifice by the differential pressure conditions created across the orifice.

* * * * *